(No Model.)

P. M. KLING.
BRAKE HANDLE.

No. 464,100. Patented Dec. 1, 1891.

Witnesses
R. B. Walker
Chas. T. Greve

Inventor:
Peter M. Kling
By Frank O. Loveland
his atty

THE NORRIS PETERS CO., PHOTO-LITHO., WASHINGTON, D. C.

UNITED STATES PATENT OFFICE.

PETER M. KLING, OF ST. LOUIS, MISSOURI.

BRAKE-HANDLE.

SPECIFICATION forming part of Letters Patent No. 464,100, dated December 1, 1891.

Application filed April 27, 1891. Serial No. 390,716. (No model.)

*To all whom it may concern:*

Be it known that I, PETER M. KLING, a citizen of the United States, residing at St. Louis, in the State of Missouri, have invented a new and useful Improvement in Brake-Handles, of which the following is a specification.

My invention consists of a novel brake-handle adapted for use on street-cars and other vehicles, hereinafter fully described and claimed.

Figure 1:
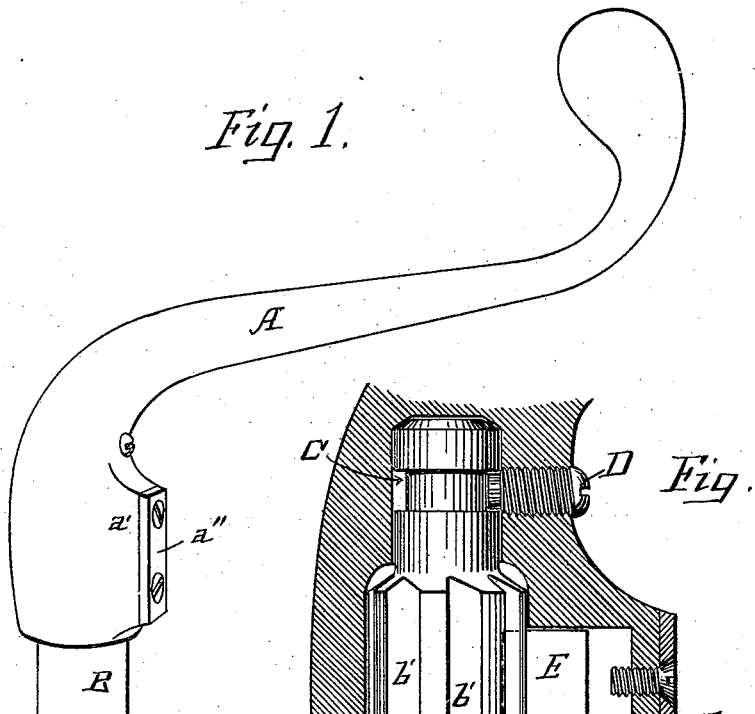
Figure 2:
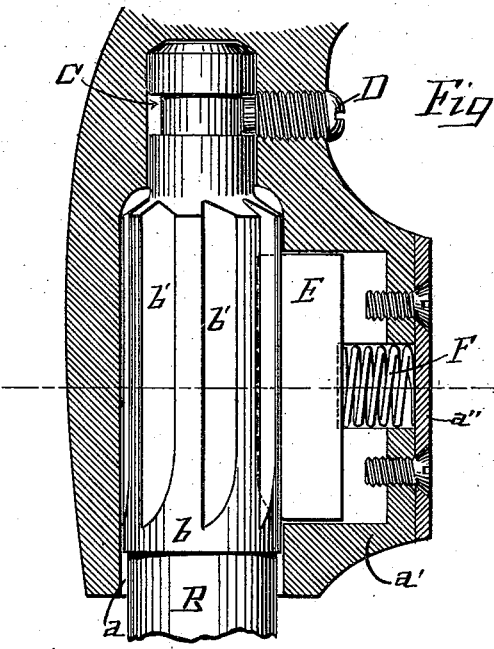
Figure 3:
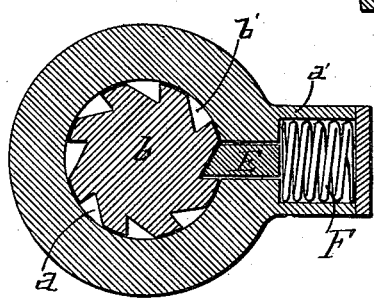
Figure 4:
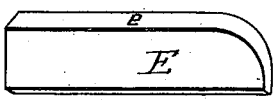

Figure 1 is a perspective view of one of my improved handles. Fig. 2 is a vertical section. Fig. 3 is a section on line 3 3 in Fig. 2. Fig. 4 is a perspective view of the dog.

A is a brake-handle having at one end a spindle-socket $a$ and housing $a'$.

B is a vertical brake-spindle having a fluted collar $b$ near its upper end. The flutes $b'$ are preferably several inches long, the edges of which form ratchet-shaped teeth, as shown in Fig. 3. Above the flutes is an annular recess C. The spindle takes into the spindle-socket and is locked thereto by a set-screw D in the handle taking into the annular recess in the spindle. I prefer to make the upper portion of the spindle, including the flutes and annular recess, in the form of a stub and then weld or otherwise rigidly secure it to the brake-spindle. The flutes and annular recess may, however, be made in the spindle proper, if desired.

E is a dog substantially the length of the flutes, and having a beveled edge $e$, adapted to take into the flutes and serve as a pawl to prevent the handle turning on the spindle when rotated in the direction taken by the hands of a watch and to be forced out of engagement with the teeth by the teeth themselves and permit the handle turning on the spindle as an axis when it is rotated in the opposite direction. The dog is supported and guided by the walls of the housing $a'$. A spring F tends to force the dog into engagement with the teeth. The spring and dog may be removed by detaching a plate $a''$ on the housing.

I claim—

The combination of a vertical brake-spindle B, having a fluted collar $b$ and annular recess C thereon near one end, a brake-handle A, having a socket $a$ thereon adapted to take over the fluted end of the spindle and fastened thereon by means of a set-screw D, taking into the annular recess on the spindle, a housing $a'$ on the handle, a horizontal spring-pressed dog loosely mounted therein and adapted to take through one wall of the housing and to automatically engage the fluted spindle to prevent the handle turning on the spindle in one direction and to be automatically released therefrom when the handle is turned in the opposite direction, and a detachable plate $a''$, whereby the spring and dog are made removable, substantially as and for the purpose specified.

PETER M. KLING.

Witnesses:
GEO. H. KNIGHT,
E. S. KNIGHT.